E. J. WILSON.
CUSPIDOR.
APPLICATION FILED AUG. 29, 1919.

1,330,828. Patented Feb. 17, 1920.

INVENTOR
Ervon J. Wilson
BY HIS ATTORNEYS

UNITED STATES PATENT OFFICE.

ERVON J. WILSON, OF MINNEAPOLIS, MINNESOTA, ASSIGNOR OF ONE-HALF TO ANTON O. OUREN, OF MINNEAPOLIS, MINNESOTA.

CUSPIDOR.

1,330,828.      Specification of Letters Patent.      Patented Feb. 17, 1920.

Application filed August 29, 1919. Serial No. 320,567.

*To all whom it may concern:*

Be it known that I, ERVON J. WILSON, a citizen of the United States, residing at Minneapolis, in the county of Hennepin and State of Minnesota, have invented certain new and useful Improvements in Cuspidors; and I do hereby declare the following to be a full, clear, and exact description of the invention, such as will enable others skilled in the art to which it appertains to make and use the same.

My invention has for its object to provide an extremely simple and highly efficient cuspidor, and to such ends, generally stated, the invention consists of the novel devices and combinations of devices hereinafter described and defined in the claims.

The invention is illustrated in the accompanying drawings, wherein like characters indicate like parts throughout the several views.

Referring to the drawings:—

Figure 1:
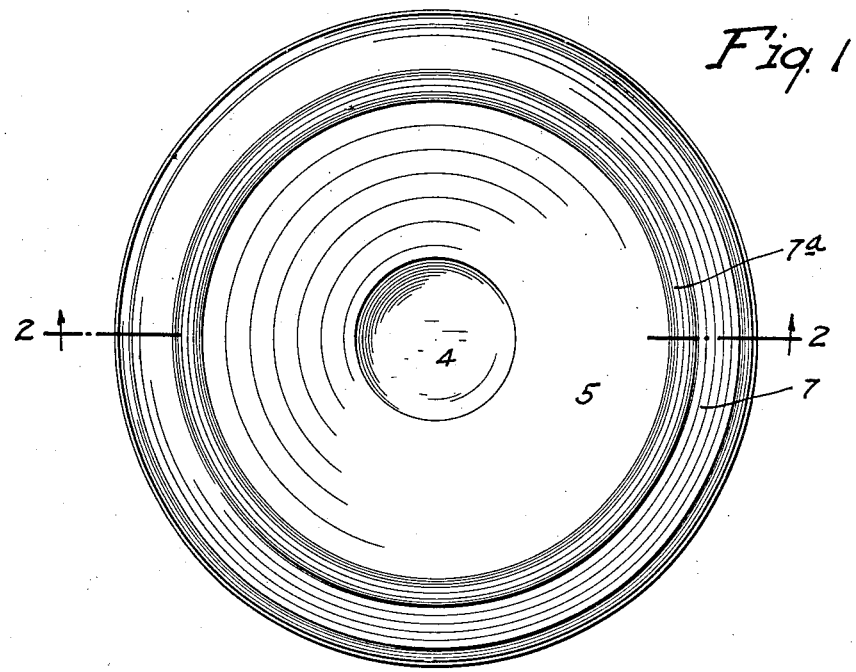
Figure 1 is a plan view of the improved cuspidor.
Figure 2:
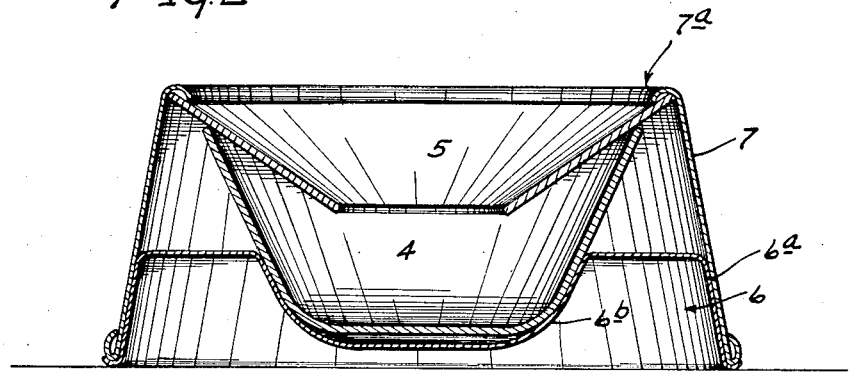
Fig. 2 is a section taken on the line 2—2 of Fig. 1.
Figure 3:
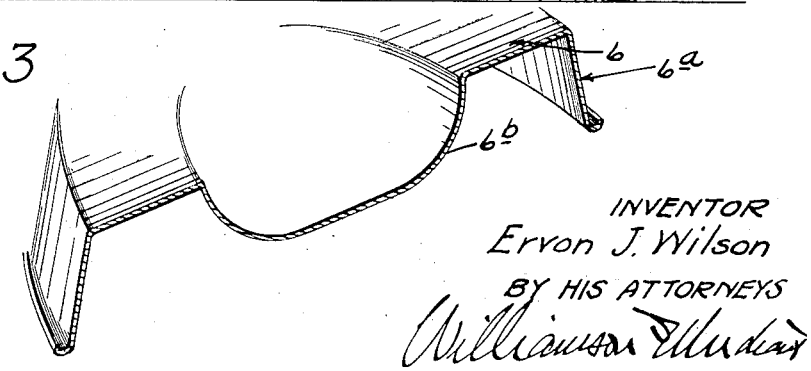
Fig. 3 is a sectional perspective showing the base member of the cuspidor casing.

The cuspidor comprises as its main elements a bowl 4, a funnel 5, a base member 6, and a clamping rim 7.

The bowl 4 and funnel 5 are of heavy paper being preferably pressed into shape from paper stock or digested vegetable fiber and advisably treated with materials making them impervious to water and sanitary or antiseptic. These two elements 4 and 5 are for temporary use and will be thrown away in lieu of cleaning the bowl or by an operation corresponding to cleaning the cuspidor.

It is important that the bowl be properly centered in respect to the funnel and, moreover, it is important that the base member 6, which supports the bowl, be of such nature that, in case of leakage of the bowl because of defective construction, the leakage will not get onto the floor but will be held by the base. Hence, this base 6 is made of sheet metal stamped to form a marginal rim portion 6ᵃ and a bowl portion 6ᵇ, which latter receives and approximately fits the bottom of the bowl 4 and serves as an auxiliary or safety bowl for catching leakage.

The rim member 7 is also preferably of stamped sheet metal and its body is of annular conical form of a size to fit the rim portion 6ᵃ of the base 6. At its smaller upper edge, the rim member 7 is provided with an inturned flange 7ᵃ that overlaps the outer edge of the funnel 5 and centers the same in respect to the bowl.

This improved cuspidor can, as has been demonstrated in practice, be manufactured at small cost and, at the same time, is not only efficient for the purposes had in view, but is sanitary in that it may be cleaned simply by providing the same, at very small cost, with new bowls and funnels.

What I claim is:—

1. A cuspidor comprising a replaceable bowl and a replaceable funnel, in combination with a metallic base member formed with an auxiliary bowl to receive the bottom of the replaceable bowl, and a rim member fitting the rim of said base and engaging the edge of the funnel.

2. A cuspidor comprising a replaceable bowl and a replaceable funnel, in combination with a pressed sheet metal base formed with an integral tapered rim flange and with an auxiliary centrally located bowl, the latter receiving the bottom of said replaceable bowl, and an annular conical sheet metal rim member detachably fitting the rim flange of said base and at its upper edge having an inturned flange overlapping the edge of said funnel and centering the same in respect to said bowl.

In testimony whereof I affix my signature in presence of two witnesses.

ERVON J. WILSON.

Witnesses:
BERNICE G. BAUMANN,
HARRY D. KILGORE.